No. 687,750. Patented Dec. 3, 1901.
M. HELD.
ARTIFICIAL LIMB JOINT.
(Application filed Sept. 3, 1901.)

(No Model.)

Witnesses:
Geo. W. Young
N. E. Oliphant

Inventor
Max Held
By H. G. Underwood
Attorneys

UNITED STATES PATENT OFFICE.

MAX HELD, OF MILWAUKEE, WISCONSIN.

ARTIFICIAL-LIMB JOINT.

SPECIFICATION forming part of Letters Patent No. 687,750, dated December 3, 1901.

Application filed September 3, 1901. Serial No. 74,213. (No model.)

*To all whom it may concern:*

Be it known that I, MAX HELD, a citizen of the United States, and a resident of Milwaukee, in the county of Milwaukee and State of Wisconsin, have invented certain new and useful Improvements in Artificial-Limb Joints; and I do hereby declare that the following is a full, clear, and exact description thereof.

My invention has for its object to exclude dirt from artificial-limb joints, especially those of the ball-bearing type, and to overcome the wear that ordinarily occurs in such joints, said invention consisting in certain peculiarities of construction and combination of parts hereinafter particularly set forth with reference to the accompanying drawings, and subsequently claimed.

Figure 1:
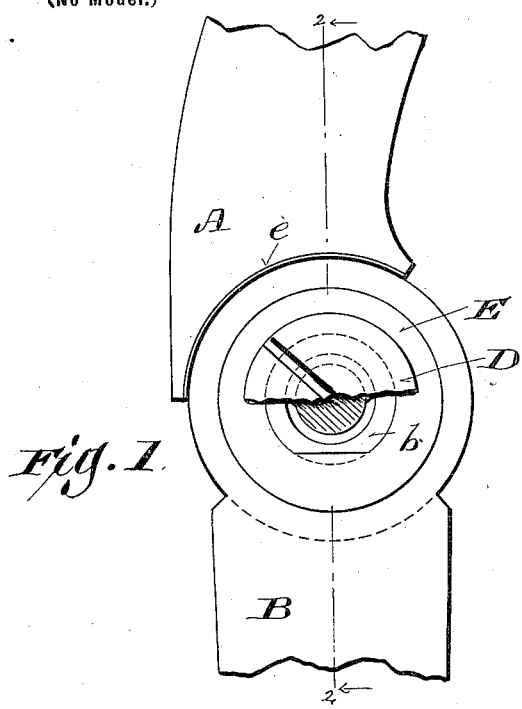
Figure 2:
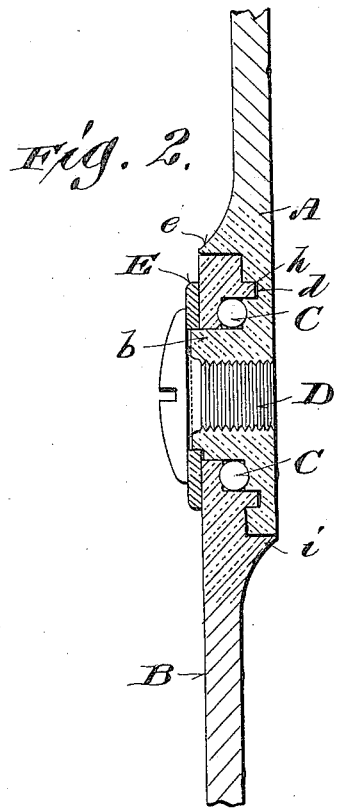
Figure 3:
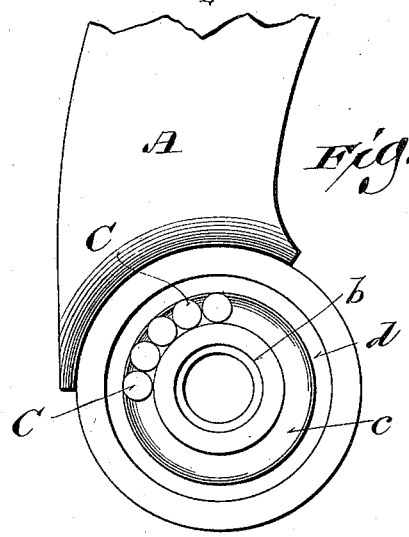
Figure 4:
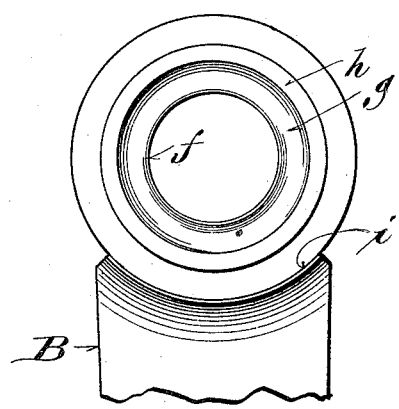

Figure 1 of the drawings represents a side elevation of an artificial-limb joint in accordance with my invention, the head of a screw constituting part of the joint being partly broken away; Fig. 2, a sectional view of said joint indicated by line 2 2 in the first figure, and Figs. 3 and 4 detail elevations of the joint-sections.

Referring by letter to the drawings, A B indicate the metal arms of an artificial-limb joint, the meeting ends of these arms being made to have intermatching rotatory connection one with another. The rounded end of arm A is provided with an inner center stud $b$, ball-race $c$, annular groove $d$ of greater diameter than the ball-race immediately adjacent thereto, and a side flange $e$, this flange being common in the ball-bearing type of artificial-limb joints to which my invention relates. The rounded end of arm B is provided with a center eye $f$, that fits stud $b$ of the arm A, a ball-race $g$, an annular shoulder $h$, adjacent to this ball-race, engageable with the aforesaid groove, and a flange $i$, this flange being usual in the art and extended in a direction opposite the one aforesaid, the disposition of the flanges being such with relation to each other that they constitute stops for limiting play of the joint in either direction of its yield.

The joint ends of arms A B fit together against interposed balls C in the space formed by the ball-races, a screw D engages a tapped center bore of stud $b$, and a washer E in angular fit on the end of said stud exposed through eye $f$ is opposed by a head with which the screw is provided.

From the foregoing it will be understood that the engagement of groove $b$ by shoulder $h$ excludes dirt from the ball-chamber of the joint, and the joint ends of the arms A B are preferably chilled or otherwise hardened, there being increase of contact-surface in said joint to take the wear that ordinarily occurs, and lost motion that is disagreeable and sometimes dangerous in practice is compensated for by tightening the screw.

Having thus described my invention, what I claim as new, and desire to secure by Letters Patent, is—

An artificial-limb joint having the rounded flanged end of one of its arms provided with an inner bored and tapped center stud, a ball-race and an annular groove of greater diameter than the ball-race immediately adjacent thereto; the rounded flanged end of its other arm provided with a central stud-fitting eye, a ball-race and an annular shoulder engaging the aforesaid groove; balls engaging the space formed by the ball-races, a washer having angular fit on the end of the stud exposed through said eye, and a stud-engaging screw having a washer-opposing head.

In testimony that I claim the foregoing I have hereunto set my hand, at Milwaukee, in the county of Milwaukee and State of Wisconsin, in the presence of two witnesses.

MAX HELD.

Witnesses:
   ANTON URSCHITZ,
   B. C. ROLOFF.